(12) United States Patent
Vaidya et al.

(10) Patent No.: US 9,224,126 B2
(45) Date of Patent: Dec. 29, 2015

(54) COLLABORATIVE DECISION MAKING

(75) Inventors: Ashish Vaidya, Bangalore (IN); Stephen R Carter, Spanish Fork, UT (US); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 223 days.

(21) Appl. No.: 12/782,230

(22) Filed: May 18, 2010

(65) Prior Publication Data

US 2011/0231779 A1    Sep. 22, 2011

Related U.S. Application Data

(60) Provisional application No. 61/315,481, filed on Mar. 19, 2010.

(51) Int. Cl.
*G06F 3/048* (2013.01)
*G06F 3/00* (2006.01)
*G06Q 10/10* (2012.01)

(52) U.S. Cl.
CPC ...................... *G06Q 10/10* (2013.01)

(58) Field of Classification Search
CPC ..... G06Q 10/10; G06F 3/0481; G06F 3/0482; G06F 3/0483; H04N 7/15; H04L 12/1813; H04L 12/581
USPC ......................................... 715/810, 764, 753
See application file for complete search history.

(56) References Cited

U.S. PATENT DOCUMENTS

| 6,119,149 | A | 9/2000 | Notani | |
|---|---|---|---|---|
| 6,332,155 | B1 | 12/2001 | Notani | |
| 6,826,552 | B1 * | 11/2004 | Grosser et al. | 706/47 |
| 6,876,991 | B1 | 4/2005 | Owen et al. | |
| 6,885,388 | B2 * | 4/2005 | Gunter et al. | 715/751 |
| 6,938,069 | B1 * | 8/2005 | Narayanaswamy | 709/204 |
| 7,299,217 | B2 | 11/2007 | Oni | |
| 7,325,196 | B1 * | 1/2008 | Covington et al. | 715/251 |
| 7,401,059 | B1 | 7/2008 | Owen et al. | |
| 7,617,169 | B1 | 11/2009 | Owen et al. | |
| 7,747,572 | B2 * | 6/2010 | Scott et al. | 707/636 |
| 7,890,405 | B1 * | 2/2011 | Robb | 705/36 R |
| 2003/0069870 | A1 * | 4/2003 | Ras et al. | 706/54 |
| 2003/0070176 | A1 * | 4/2003 | Parker et al. | 725/105 |
| 2004/0104933 | A1 * | 6/2004 | Friedrich et al. | 345/751 |
| 2006/0174199 | A1 * | 8/2006 | Soltis et al. | 715/700 |
| 2006/0282856 | A1 * | 12/2006 | Errico et al. | 725/46 |
| 2007/0208806 | A1 * | 9/2007 | Mordecai et al. | 709/204 |
| 2007/0244969 | A1 * | 10/2007 | Knight et al. | 709/204 |
| 2008/0281915 | A1 * | 11/2008 | Elad et al. | 709/204 |
| 2009/0063379 | A1 | 3/2009 | Kelly | |
| 2009/0193345 | A1 * | 7/2009 | Wensley et al. | 715/756 |
| 2010/0077317 | A1 * | 3/2010 | Kritt et al. | 715/752 |
| 2011/0016179 | A1 * | 1/2011 | Bechtel | 709/205 |
| 2011/0035687 | A1 * | 2/2011 | Katis et al. | 715/758 |
| 2011/0119598 | A1 * | 5/2011 | Traylor et al. | 715/753 |
| 2011/0270774 | A1 * | 11/2011 | Varshavsky et al. | 705/319 |

* cited by examiner

*Primary Examiner* — Amy Ng
*Assistant Examiner* — Erik Stitt
(74) *Attorney, Agent, or Firm* — Schwegman Lundberg & Woessner, P.A.

(57) ABSTRACT

Techniques for collaborative decision making are presented. A collaborative decision making process is referred to as a buzz. A principal creates and defines the policies for the buzz as well as the criteria for participants of the buzz. The buzz is launched for online collaboration and is managed according to the policies. Actions and decisions are logged and recorded during the buzz.

19 Claims, 6 Drawing Sheets

FIG. 6

COLLABORATIVE DECISION MAKING

This application claims the benefit of priority under 35 U.S.C. 119(e) to U.S. Provisional Patent Application Ser. No. 61/315,481, filed on Mar. 19, 2010, which is incorporated herein by reference in its entirety.

BACKGROUND

Social networking is rapidly becoming a phenomenon in all societies of the world. A few prominent examples include Face Book, Twitter™, and Linkedin®. Consumers, enterprises, organizations, movie stars, politicians, sports stars, and others utilize these social networking sites to communicate and in some cases collaborate with one another.

One area where social networking and collaboration has not made any real progress is decision making.

With decision making, a common challenge regularly encountered is the need to make a decision with input from others. Sometimes a decision is as simple as where to go to lunch whereas other times a decision can be a very complex process of deciding where in the world the next face-to-face meeting should be held for a globally distributed organization. There are many issues involved in making collaborative decisions including: 1) who the decision-makers are; 2) what constitutes success or completion in making the decision; 3) how the decision will be carried out once made; 4) how past decisions may be used or may influence future decisions; and 5) how the decision-making process can be conducted when the decision-makers are geographically dispersed throughout the world.

Furthermore, existing collaboration services are commonly fraught with issues of: 1) digital identity (knowing who is involved in the collaboration); 2) policy governing the collaboration; 3) resources to conduct the collaboration; etc.

SUMMARY

Techniques for collaborative decision making are presented. More particularly, and in an embodiment, a method for collaborative decision making is described. A request is received from a principal to initiate an online collaborative decision process referred to as a buzz. Goals for success of the buzz, participant criteria for participants in the buzz, and policies for managing and concluding the buzz are received from the principal. The buzz is initiated online for participation by the participants and the principal. Finally, the buzz is managed in accordance with the policies.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "cloud computing environment" refers to a self-contained processing environment that includes physical and logical resources that are dispersed over a network, such as the Internet. The distributed nature of the cloud computing environment is abstracted and obscured from principals (users and automated services) of the cloud computing environments.

The term "buzz" is used to indicate the activities needed to propose, collaborate, and conclude a collaborative decision making effort. So, "buzz" may be used synonymously and interchangeably with the phrase "collaborative decision process" or "collaborative decision making process."

A "closed collaboration decision making process" is one in which someone is designated the leader; the buzz is definitive and unanimous. An "open collaboration decision making process" is one in which anyone can declare to be the leader, the buzz ends with one decision but can spawn other buzzes for other sub-decisions; so, a decision is made with other options still available and perhaps ongoing.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-6.

Figure 1:
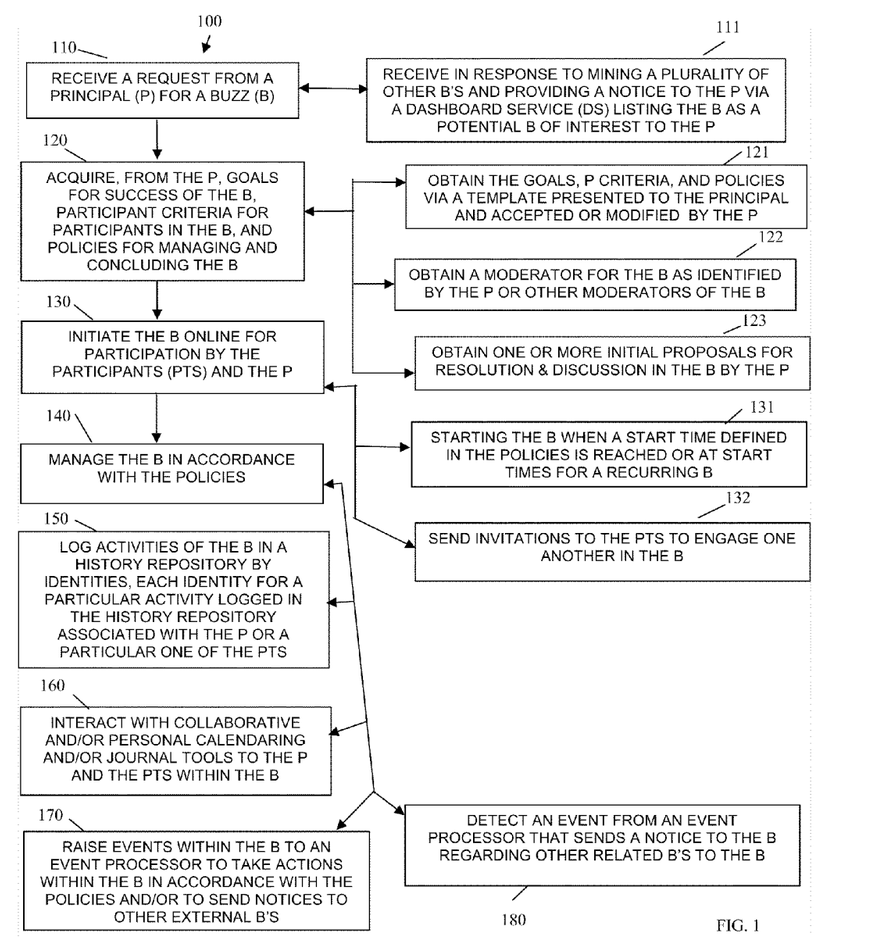
FIG. 1 is a diagram of a method for collaborative decision making, according to an environment.

FIG. 1 is a diagram of a method 100 for collaborative decision making, according to an environment. The method 100 (hereinafter "decision making service") is implemented in a machine-accessible and non-transitory computer-readable medium as instructions that execute on one or more processors (machines, computers, processors, etc.). The machines are specifically configured to process the decision making service. Furthermore, the decision making service is operational over and processes within a network. The network may be wired, wireless, or a combination of wired and wireless. In an embodiment, the network is the Internet.

At 110, the decision making service receives a request from a principal (user or automated service) to initiate or begin an online collaborative decision process. Again, the online collaborative decision process is referred to herein as a "buzz."

According to an embodiment, at 111, the decision making service receives the request from the principal in response to a selection made by the principal that lists the buzz as a potential buzz of interest to the principal on a dashboard service. For example, consider that the interface to the decision making service is implemented within a browser. Within the browser, which the principal interacts with on a client device, is a dashboard that shows the buzz as a potential buzz based on interests of the principal registered with a buzz mining service. The buzz mining service mines one or more repositories for buzz descriptions, buzz activities, buzz participants, and the like. When a match is found, the buzz is presented via the dashboard within the browser to the principal and when the principal selects it within the browser, the act of selection results in the decision making service receiving the request for the buzz. This may also be a template from a buzz that is selected.

At 120, the decision making service acquires from the principal goals that dictate success for the buzz, participant criteria for selecting or defining participants within the buzz, and policies for managing and concluding the buzz. It is noted that some buzzes may never conclude but they will have decisions and conclude some proposals. Other buzzes conclude when a decision is made or when criteria defining conclusion is reached. Other buzzes might be repetitive or cyclical where the same types of decisions need to be made every week or month with the same participant and same resources, but with different outcomes each cycle. Various types of closed and open buzzes are presented and discussed below with reference to the FIGS. 5 and 6.

Also, the participant criteria can take a variety of forms. For example, the principal can supply a specific set of identities as the participants. In other cases, a list of roles can define when identities are assigned to those roles that those identities comprise the participants. The criteria can also define other selection policies that are dynamically evaluated to resolve identities that comprise the participants.

Figure 5:
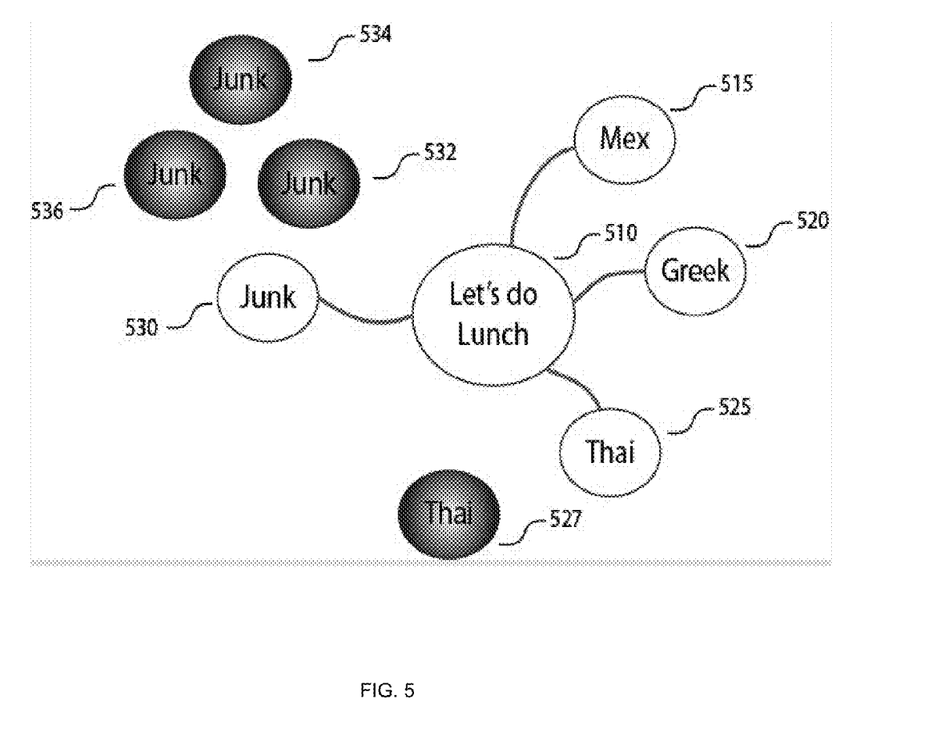
FIG. 5 depicts an example open collaborative decision making scenario, according to an example embodiment.
Figure 6:
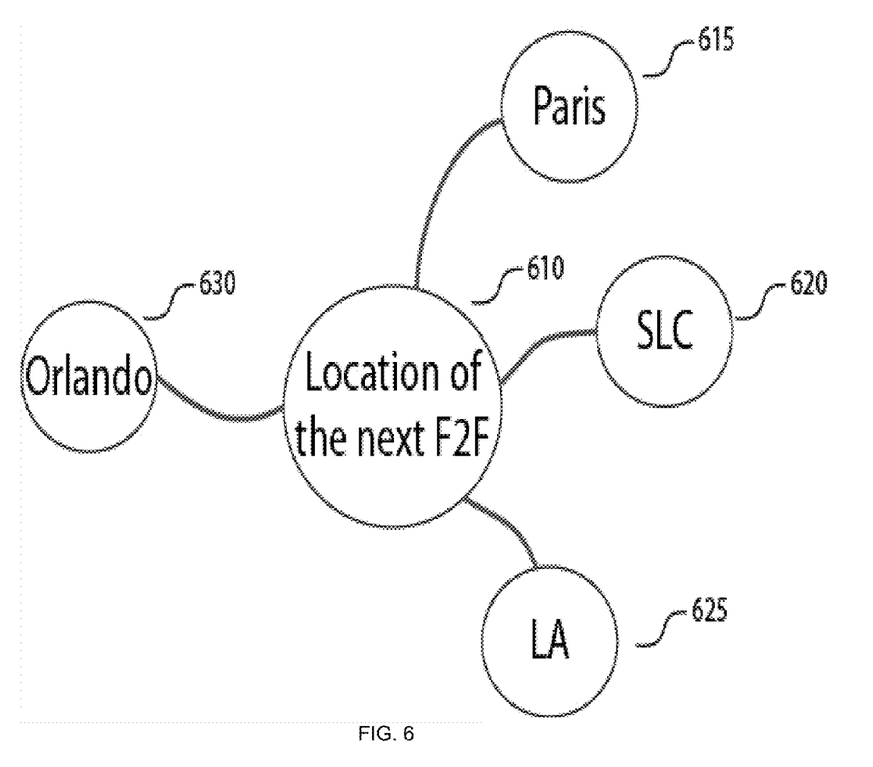
FIG. 6 depicts an example closed collaborative decision making scenario, according to an example embodiment.

The types of policies that drive the management and conclusion, if at all, of the buzz are also presented below with the discussion of the FIGS. 4-6.

In an embodiment, at 121, the decision making service obtains the goals, the principal criteria, and the policies via a template. The template is presented to the principal and the principal modifies the template to supply specific values that comprise the goals, the principal criteria, and the policies. In some situations, the principal may not have to modify the template if all values are as the principal wants them to be. In another case, the template can drive an interaction with the principal for information needed to construct the buzz thereby acquiring input parameters to populate to the template and used to form the buzz. So, the principal may indirectly modify the template via a service that processes the template and via an interaction to acquire the parameter values for populating the template. It is also noted that multiple buzzes can be simultaneously activated from the same template. Example usages of the templates and components of the templates are discussed below with reference to the FIG. 4.

In another case, at 122, the decision making service obtains a moderator for the buzz, which the principal identifies. The moderator stays apprised of activity of the buzz, via event notifications and/or a dashboard service and can inject policy or information to control and manage the buzz. Example activities associated with the moderator are also presented below with reference to the FIG. 4. The principal may also define the moderator via criteria similar to the principal selection criteria. Still further, the principal can define alternative moderators when an assigned moderator leaves the buzz and/or is unavailable when needed to perform moderator duties of the buzz. It is noted that multiple moderators can be assigned and active at the same time for the buzz. Moderators can also assign other new moderators while managing the buzz. The principal can also override moderator decisions during the buzz.

In yet another situation, at 123, the decision making service obtains one or more initial proposals for resolution and discussion within the buzz by the principal. Proposals are sub decisions or discussion items that are primary or secondary to reaching decisions within the buzz.

At 130, the decision making service initiates the buzz online for participation by the participants and the principal. Initiation can occur on one or more processing devices, web sites, or hosting machines. Moreover, the devices, sites, and/or machines can utilize security and security communication protocols if dictated by the policies of the buzz.

In one situation, at 131, the decision making service determines that the buzz has a delayed start time such that it is started only when a start time defined in the policies is reached. It is noted, that the start time can be dynamically defined based on the detection of events defined in the policies. For example, when a different buzz concludes or reaches a decision for a proposal of interest, an event can be tracked and detected that then (based on a policy) results in creating an immediate start time for the buzz to be initiated. Similarly, a buzz can have stop criteria in the policy dictating when a buzz must be completed. With stop criteria that is satisfied and buzz still lacking a decision, the principal can make the decision based on a current state of the buzz or the principal can allow the buzz to lapse without a decision because the participants were unable to achieve a state where the policy would specify a possible decision on their behalf. In another case, at 131, the buzz can be initiated at start times when the buzz is a recurring buzz (starting at the first of the month, certain day of the week, certain time of day, etc.).

In another scenario, at 132, the decision making service sends online invitations to the participants (identified via the participant criteria) for those participants to engage one another and the principal in the buzz. These online invitations can be sent via a variety of in-band and out-of-band channels, such as via a text, via an instant message, via publication to a website, via an email, and the like.

At 140, the decision making service manages the buzz in accordance with the policies. Here, a variety of situations can occur, such as spawning or forking sub buzzes or new buzzes, masking some identities (in accordance with policy), logging activities in a history repository, and others. At 140, the policies can also dictate when the buzz is to be terminated, if at all. A variety of managing activities or actions are defined in detail below with reference to the FIGS. 4-6.

It should be noted that the life cycle of each buzz can be logged and audited so that is clear when a particular buzz stated, who joined that buzz, when that buzz stopped, which if any other buzzes were spawned or forked off from the buzz being audited. There can also be an interface for tracking and auditing the buzz; this interface can enforce security restrictions such that it could be open to all, just the moderators, just the principals that created the buzz, just administrators, or combinations of these resources.

According to an embodiment, at 150, the decision making service logs activities of the buzz in a history repository by identities. Each identity is associated with a particular activity logged in the history repository and is assigned or associated with the principal or a particular one of the participants.

In another case, at 160, the decision making service provides calendaring and/or journal tools to the principal and the participants within the buzz. So, a collaborative calendar can be used by the principal and the participants to schedule meetings or discussions on line. The meetings can occur in a variety of manners permitted by the policies, such as via video conference, etc. Similarly, journal or document repositories can be shared and collaborated on during the buzz, again as permitted by policy. It is also noted that a particular individual or principal's calendar or journal application can be integrated with the buzz as well as other organizational tools. So, the calendaring and/or journaling tools do not have to be collaborative in all cases but can be. Also, any collaborative tool can integrate with personal tools of principals via the buzz.

In one situation, at 170, the decision making service raises events within the buzz to an event processor to take actions within the buzz in accordance with the policies and/or to send notices to other external buzzes. The events of interest can be defined by the principal or assigned based on a specific template that was used by the principal in initially defining the buzz.

In a scenario, at 180, the decision making service detects and event from an event processor that sends a notice to the buzz regarding other related buzzes to the buzz. In this way, events can be used to track similar buzzes or buzzes that impact or are linked in some manner to the buzz.

Figure 2:
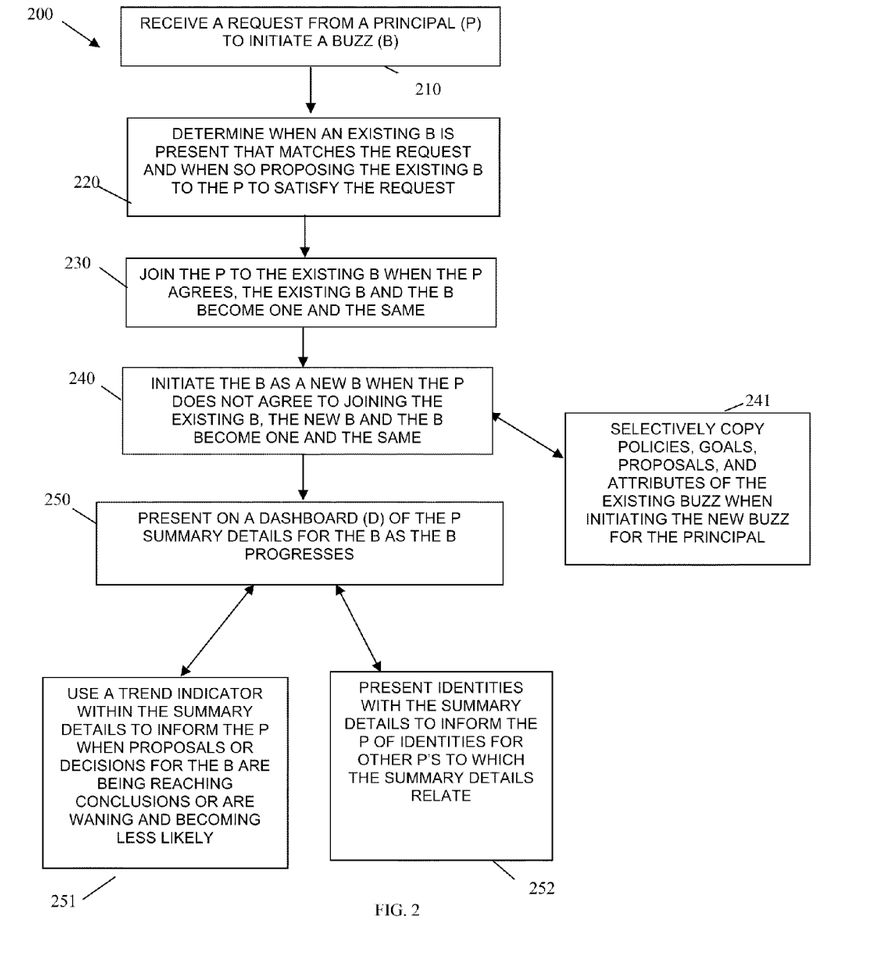
FIG. 2 is a diagram of another method for collaborative decision making, according to an environment.

FIG. 2 is a diagram of another method 200 for collaborative decision making, according to an environment. The method 200 (hereinafter "collaborative decision making service") is implemented in a machine-accessible and non-transitory computer-readable medium as instructions that execute on one or more processors (machines, computers, processors, etc.). The machine is specifically configured to process the collaborative decision making service. Furthermore, the collaborative decision making service is operational over and processes within a network. The network may be wired, wireless, or a combination of wired and wireless. In an embodiment, the network is the Internet.

The collaborative decision making service presents another and in some cases enhanced perspective of the decision making service represented by the method 100 of the FIG. 1.

At 210, the collaborative decision making service receive a request from a principal to initiate a buzz. The process of establishing a new buzz was presented above with reference to the method 100 of the FIG. 1.

At 220, the collaborative decision making service determines when an existing buzz is present that matches or substantially matches the request and when this occurs, the collaborative decision making service provides the existing buzz to the principal to satisfy the request. A scoring technique and a threshold value can be used to perform a substantial match on the existing buzz.

At 230, the collaborative decision making service joins the principal to the existing buzz when the principal agrees to the joining and when policy permits the principal to join. In this case, the existing buzz becomes or is one and the same as the buzz that the principal initially requested.

At 240, the collaborative decision making service initiates the buzz as a new buzz when the principal does not agree to joining the existing buzz. Here, the new buzz that the collaborative decision making service initiates for the principal becomes one and the same with the buzz that the principal requested.

So, the principal's request can be satisfied by joining the principal to an existing buzz or by creating a new buzz for the principal. The technique for creating the new buzz was presented in detail above with reference to the method 100 of the FIG. 1.

According to an embodiment, at 241, the collaborative decision making service selectively copies policies, goals, proposals, and attributes of the existing buzz when initiating the new buzz as the buzz for the principal.

In an embodiment, at 250, the collaborative decision making service presents on a dashboard of the principal summary details for the buzz as the buzz progresses to decisions and conclusion, if at all. Example summary details are presented below in detail with reference to the FIGS. 4-6.

Continuing with the embodiment of 250 and at 251, the collaborative decision making service uses a trend indicator within the summary details to inform the principal when proposals or decisions for the buzz are reaching conclusions or are waning and becoming less likely. This permits the principal and/or moderators to monitor and see if a decision of the buzz is progressing in a manner that the principal would like to see occur. In this way the principal can interject information in an attempt to alter the trend of the buzz and to steer it back on the track that the principal desires. Alternatively, if the trend is favorable to the wants of the principal, then the principal can either let it be or attempt to accelerate a decision to get it to closure faster or more expediently.

Continuing with the embodiment of 250 and at 252, the collaborative decision making service presents identities with the summary details to inform the principal of identities for other principals to which the summary details relate. In this manner, the principal may attempt to influence a particular principal if that principal is not moving in a direction that the principal wants. Alternatively, the principal may use the information to influence still different principals to either support or move away from the direction of a particular principal.

Figure 3:
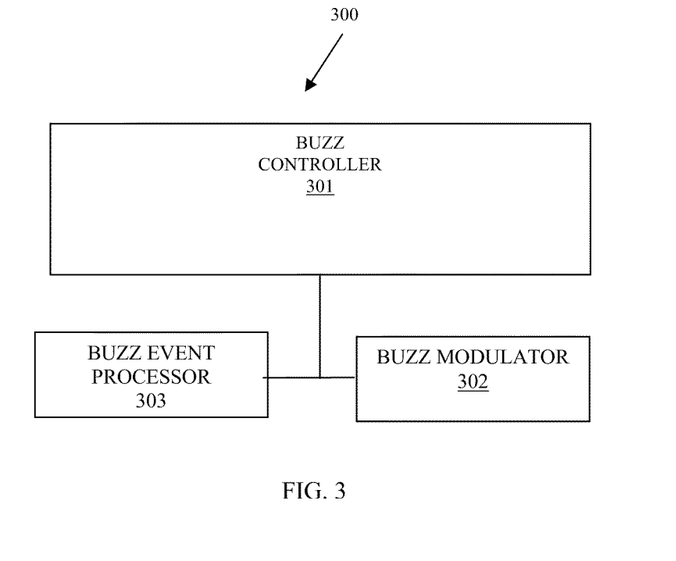
FIG. 3 is a diagram of a collaborative decision making system, according to an example embodiment.

FIG. 3 is a diagram of a collaborative decision making system 300, according to an example embodiment. The collaborative decision making system 300 is implemented in a machine-accessible and non-transitory computer-readable medium as instructions that execute on multiple processors (machines, computers, processors, etc.). The machines are specifically configured to process the collaborative decision making system 300. Furthermore, the collaborative decision making system 300 is operational over and processes within a network. The network may be wired, wireless, or a combination of wired and wireless. In an embodiment, the network is the Internet.

The collaborative decision making system 300 includes a buzz controller 301, a buzz modulator 302, and a buzz event processor 303. Each of these components and their interactions with one another will now be described below in turn.

The buzz controller 301 is implemented and resides in a non-transitory computer-readable storage medium and executes on a first processor of the network. The first processor is configured to start the buzz controller 301 on the first processor. The buzz controller 301 is configured to initiate one or more buzzes. Example processing associated with the buzz controller 301 is presented above with reference to the methods 100 and 200 of the FIGS. 1 and 2, respectively, and also below with reference to the discussion of the FIG. 4.

The buzz controller 301 joins participants to the buzzes and ensures policies for each buzz are satisfied.

According to an embodiment, the buzz controller 301 splits at least one buzz into two or more separate buzzes that are linked together via one or more references.

In some cases, at least one buzz is a closed-decision making process where a moderator is assigned and when a decision is reached that particular buzz concludes. Multiple moderators can exists as well.

In other cases, at least one buzz is an open decision making process where more than one leader exists for the buzz. Each leader self appoints his/her leadership roll within that buzz and when a decision is reached other decisions still exists that spawns off as sub buzzes.

The buzz modulator 302 is implemented within and resides within a non-transitory computer-readable storage medium and executes on a second processor. The second processor specifically configured to execute the buzz modulator 302.

The buzz modulator 302 is configured to affect a buzz as per instructions from a participant. Moreover, the buzz modulator 302 provides information to the buzz controller, the buzzes, and the participants via instructions (trapped and managed via the buss event processor 303). Example aspects of the buzz modulator 302 are presented below with reference to the FIG. 4.

The buzz event processor 303 is implemented within and resides within a non-transitory computer-readable storage medium and executes on a third processor. The third processor is specifically configured to execute the buzz event processor 303. Example aspects of the buzz event processor were discussed above with reference to the methods 100 and 200 of the FIGS. 1 and 2, respectively and also below with reference to the FIG. 4.

The buzz event processor 303 is configured to raise and detects events occurring within the buzzes and to send notices and also take actions based on the events.

The buzz event processor 303 traps some events from the buzz controller 301, the buzz modulator 302, and the buzzes for purposes of generating other events that are then communicated to the buzz controller 301, the buzz modulator 302, and the buzzes.

Figure 4:
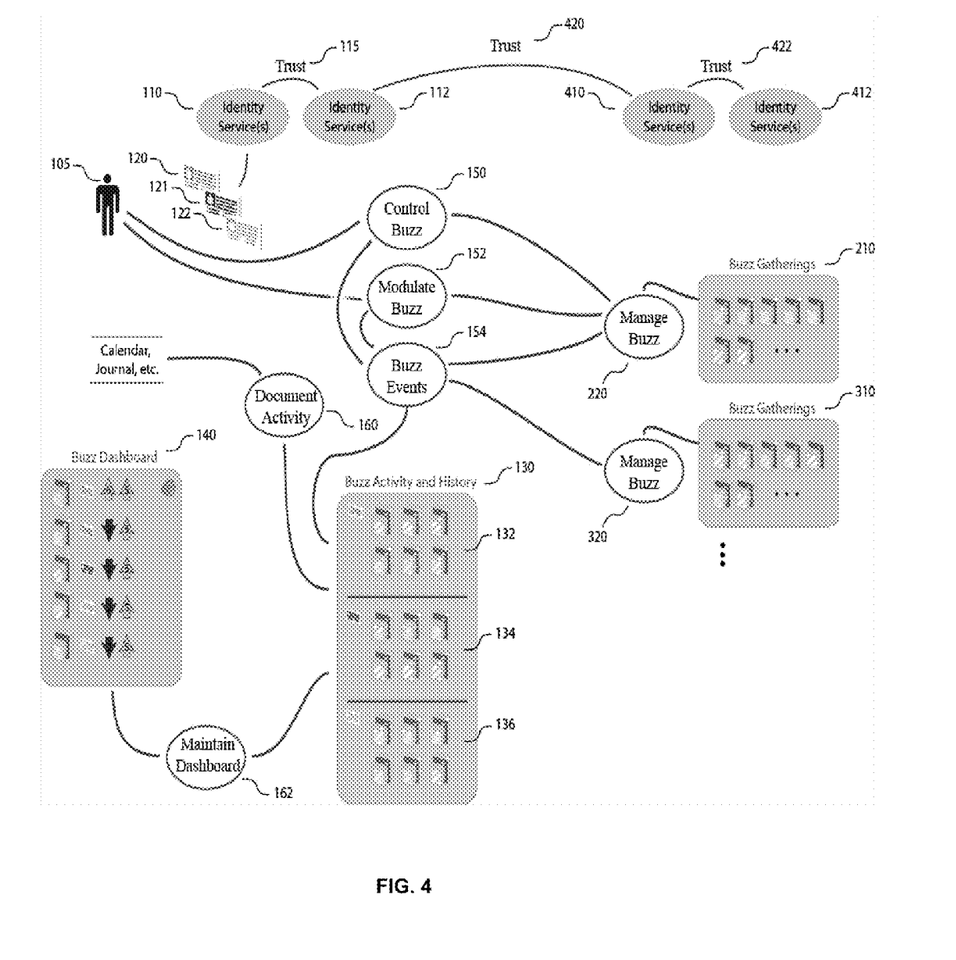
FIG. 4 depicts an example component interaction overview of collaborative decision making system, according to an example embodiment.

FIG. 4 depicts an example component interaction overview of collaborative decision making system, according to an example embodiment. It is noted that a variety of components are shown for purposes of illustration and demonstrating the comprehensive approach that can be used with the teachings presented herein. Some components can be removed with others added and the components can be arranged in different interaction arrangements without departing from the beneficial teachings presented herein.

Reference is now made to the reference numbers of the FIG. 4 for purposes of the remaining discussion of the FIG. 4.

A user or agent, at 105, is interested in proposing or participating in the buzz of a collaborative decision making effort. The user or agent has previously created one or more digital identities, at 120, 121, and 122 (while the FIG. 4 uses three identities for illustration it is well to note that the user or agent may have one or more and more than three—also note that the multiple identities may be kept in an identity wallet to simplify use). Identities are created using an identity service, at 110 or 112, which have an associated trust relationship, at 115. In some cases, the identities may be "self-issued" and therefore not be part of the trust relationship. In such a situation, the self-issued identity's value to the buzz is diminished (because it lacks a trust relationship), but such situations can exist if desired.

The user, at 105, may want to use various digital identities during while participating in buzz in order to separate personal life from business life, provide anonymity, and/or to play one identity off of another. For the purposes of the discussion of the FIG. 4, it is understood that a user, at 105, may have one or more digital identities participating in the buzz.

The architecture of the FIG. 4 provides for the maintenance of both activity and history, at 130, where the activity and history of 105, using any of the digital identities at 120, 121, and 122, is recorded for future interrogation and/or use. For example, future buzz proposals may be made by 105 based on the history kept at 130. The activity and history is kept by identity so that, for example, the identity, at 120, is described by the activity and history, at 132. Therefore, 121 is related to 134 while 122 is related to 136 in the FIG. 4.

The user, at 105, uses Control Buzz, at 150, to access the gatherings shown as 210 and 310 on the FIG. 4 (please note that there may be more than two buzz gathering as is illustrated by the ellipses below 310) to participate in a buzz collaboration. Participation is managed through Managed Buzz, at 220 and 320.

The creation of a buzz takes into account many data items unique to the buzz. For example, if the buzz concerns the meeting place of the next face-to-face for a group, the success of the meeting at the face-to-face depends upon the presence of key personnel participating in the face-to-face. As a result, the goal of the buzz reflects the fact that certain identities are in attendance in order for the meeting to be successful. Thus, one of the important things that the buzz tracks is the identities of those who are required to attend the face-to-face and to make sure that all of those identities have indicated that a certain proposal is acceptable along with the time and date being proposed. The FIG. 4 provides for several templates to be available to anyone managing a buzz so that the details of setting up a buzz can be simplified. Templates can include: meeting for lunch, meeting for dinner, gathering for a meeting, gathering for an online collaboration, quorum to make a decision, open ended decision where collaboration may result in a decision, closed decision where collaboration must result in a decision, decision with a minimum number of participants (e.g., Christmas party must have 15 to make decision), etc. Each template has its own unique needs which will be reflected in the information gathered and the stipulations for success.

Thus, a user, at 105, utilizes control mechanisms, at 150, to provide information to 220 to set up, take down, modify, etc. a buzz gathering, at 210 or 310 (via 320).

Each buzz has several proposals associated with it. For example consider an open collaborative decision making process depicted in the FIG. 5, if the buzz is concerning lunch the proposals 510 may be Thai 525 or 527, Greek 520, Mexican 515, junk 530, 532, 534, and 536, etc. The buzz is around going out to lunch; the proposals concern where to have that lunch. Another example might be the location of the next face-to-face for a gathering (referring to the FIG. 6 a closed decision collaborative decision making example). In this case the buzz is about the meeting place for face-to-face 610 and the proposals may be Paris 615, Salt Lake City 620, Los Angeles 625, Orlando 630, etc. Each proposal is bound by the requirements of the buzz (for instance the participation of all required personnel). A buzz might also be set up so as to allow multiple proposals to be accepted. For example, meeting for lunch may have a group membership requirement of six or less in which case the 6 people have agreed to go out for Mexican at a certain restaurant that proposal can be closed and if others want to go to a Mexican restaurant a new proposal can be opened around going to lunch. An example of this is shown in the FIG. 5 diagram wherein three Junk proposals have been closed out and, presumably, the participants are on their way to the junk food restaurant of their choice. There is still a group trying to form around junk food at 530. There is one That group already going to lunch at 527 and another still trying to form at 525 the Mexican and Greek proposals have not yet been formulated at 515 and 520. This type of multiple proposals satisfying the buzz would not be appropriate for something such as the location of the next face-to-face shown in the FIG. 6.

Referring again to the FIG. 4, the user, at 105, utilizes Modulate Buzz, at 152, to send instructions to 220 or 320 to participate or modulate the buzz occurring a buzz gathering. This participation may include providing information to a current buzz or proposal, creating a new proposal (those that can add a proposal may be restricted by identity), joining or indicating acceptance of a proposal, etc. Again, the activities here include creating a new buzz, creating a new proposal around an existing buzz, indicating acceptance of an existing proposal, proposing modifications to existing proposal (a modification may be made by simply duplicating an existing proposal, making the change, and making it a new proposal), etc. The FIG. 4 shows the identity services, at 410 and 412, with a trust relationship, at 420 and 422, indicating that some require known identities or verifiable identities so that the participation in the buzz can be verified and controlled by policy.

Another aspect of setting up a buzz is declaring an initial membership of the buzz. This can be done by accessing the buzz activity and history, at 130, (which can be in a public location so that more than just the single user can access it). While the buzz activity and history, at 130, are organized by an identity for the user, a buzz activity and history in a public location are organized by buzz and proposal activity. In both cases, this history can be used to set up new buzz gatherings, which would include initial membership, goals, policies governing success, templates, modifications to standard templates, etc.

Note that the user, at 105, may be participating in the same buzz gathering and multiple proposals in that buzz gathering using multiple identities, as was described when describing 120, 121, and 122.

The buzz events process, at 154, receives events from 150, 152, 220, and 320, which provide information necessary for 154 to maintain buzz activity and history, at 130, by identity, at 132, 134, and 136 as appropriate. Note that if the buzz activity and history are being maintained in the public location that only the buzz of its proposals is recorded rather than any identity information of the user, at 105, excepting the participation in a buzz or proposal. In other words, the fact that the user of 105 is utilizing multiple identities to participate in the buzz or proposals does not have to be known unless the user 105 sets up the identities, at 120, 121, 122 to make that obvious. The process maintains a dashboard, at 162, which is providing a dashboard to the user, at 105, so that the dashboard, at 140, is showing the user, at 105, what buzz gatherings are in process, being created, proposals being considered, proposals closed out, etc. The dashboard would indicate to the user 105 which identity is involved in each buzz and/or proposal what the activity against the buzz or proposal is (which may be indicated by a up arrow indicating increased activity green meaning that the proposal or buzz goals have been met, down arrow meaning that interest is waning, an indication of buzz ownership (meaning that the user at 105 set up the buzz or the proposal)), etc.

The final disposition of a buzz or proposal is documented, at 160, where not only is the final disposition of the buzz or proposal documented but access to calendaring, journaling, etc. is automated so that, for example, the date and location of the next face-to-face, which was determined during the collaborative decision-making process is entered into the user's calendar. This calendaring may also be done on a group basis at some collaboration location, a group calendar, a company calendar, etc. The disposition may also be noted in a blog, website, twitter, etc. The FIG. 4 provides for a dashboard in a public location for viewing the progress and disposition of a buzz and associated proposals.

A synopsis of the flow then of the FIG. 4 is that the user, at 105, creates one or more identities and then participates in buzzes and proposals, at 150, to modify its proposals or to indicate interest, at 152, and the user receives events back concerning the activity of a buzz or proposals, at 154. The buzz gatherings, at 210 in 310, are available in a collaborative manner so that all those who are being invited can participate. The final disposition of the buzz and/or proposals are documented and displayed on the dashboard for the user's interrogation.

Not shown in the FIG. 4 is a process that interrogates known buzz gathering hosting locations, such as 210 and 310 looking for buzz topics that the user 105 may be interested in. The process which is not shown in the FIG. 4 sends back events to the buzz event, at 154, to notify the user on the dashboard that such buzz topics are available for the user's consideration. This non-shown process may use semantic processing to compare current buzz activities of the user, at 105, with other buzz activities to identify buzzes that the user, at 105, may be interested in (e.g., Brownstone, semantic processing, predictive services, etc.).

Is important to note that germane to the techniques presented herein is the fact that decisions are made. This is much more than just a matchmaking mechanism, rather, decisions are made based on policy and proposals accepted based upon the goals of the buzz.

While embodiments use identity systems, such as is shown at 110 etc., the buzz gathering may also use less sophisticated identity mechanisms such as Lightweight Directory Access Protocol (LDAP), private registration databases, etc.

Each buzz has a specific start time, an optional end time, a goal governing success, the option for multiple proposals to be accepted, a buzz description, relevant documents attached, participant list, notification lists, etc.

It is also well to note that if only one proposal is to be accepted as the final outcome of the buzz that there will be a moderator status for one or more of the participants in the buzz allowing those moderators to declare the final disposition of the buzz concerning which proposal has been accepted. Events are distributed concerning such a declaration. Said moderators may also restrict identities with the rights to add proposals, etc.

If multiple proposals can be the result of a buzz then when a group is formed from a proposal those remaining in the proposal that were not a part of the group can continue to work to achieve consensus via yet another instantiation of the proposal (e.g., going to a junk food restaurants (example of the FIG. 5)). Multiple people can declare themselves leaders in such a situation and can be the ones selecting the final group membership and closing out the group. Thus, multiple groups can be formed to go to even the same restaurant but as separate groups (e.g., proposal splitting).

As each participant provides information to a proposal that information may be used by a leader to constitute the final membership of the group. It is well to note, that in an embodiment a participant in a proposal may indicate that the participant does not want to be in a group with a specific other participant in the proposal. This declaration may be kept private or made public to the proposal as deemed by the declaring participant.

Moderator status declaration is governed by the initial setup of the buzz, setup of the proposal, declaration by an existing moderator, and/or specification by an administrator of the buzz gathering collaboration place. The moderators or the template may limit the number of proposals that may be under consideration. If a single moderator wants to leave the buzz, a new moderator may be appointed, or elected to continue the buzz.

A buzz may be split into another buzz with associated proposals. The new buzz may copy all of the existing proposals, some of the existing proposals, or none of the existing proposals. Identities may also be copied along with other materials. For example, the That, Greek, and Mexican lunch goers (of the FIG. 5 example) may split from the junk lunch goers so that the junk goers have their own buzz apart from the That, Greek and Mexican lunch goers. A link may be maintained between the split buzzes. As well, buzzes may be hierarchical, for example, a party may have separate buzzes for location, food, prizes, entertainment, etc. The hierarchy may be all controlled by the same membership, goals, etc. In an embodiment a linkage may be created between two buzzes, which were not part of a split. The purpose of a link is to show the association of the buzzes.

If a buzz is being created, buzzes that may be a duplicate are displayed so that the creator may choose to join an existing buzz rather than create a new buzz.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
 receiving a request to initiate an online collaborative decision process referred to as a buzz, the request received from a principal;
 acquiring, from the principal, goals for success of the buzz, participant criteria for participants in the buzz, and policies for managing and concluding the buzz, the principal criteria provided as a list of roles that define when identities are assigned to those roles, those role-assigned identities comprise the participants, and dynamically evaluating selection policies defined in the principal criteria to resolve some of the identities, the identities comprise the participants, and wherein at least one of the participants participates in the buzz using multiple different identities;
 initiating the buzz online for participation by the participants and the principal; and
 managing the buzz in accordance with the policies to automatically make decisions based on the policies, proposals, and goals of the buzz by interrogating and using at least in part recorded activities and histories for each of the identities and the buzz as a whole in making the decisions.

2. The method of claim 1 further comprising, logging activities of the buzz in a history repository by identities, each identity for a particular activity logged in the history repository associated with the principal or a particular one of the participants.

3. The method of claim 1 further comprising, interacting with collaborative and/or personal calendaring and/or journal tools to the principal and the participants within the buzz.

4. The method of claim 1 further comprising, raising events within the buzz to an event processor to take actions within the buzz in accordance with the policies and/or to send notices to other external buzzes.

5. The method of claim 1 further comprising, detecting an event from an event processor that sends a notice to the buzz regarding other related buzzes to the buzz.

6. The method of claim 1, wherein receiving further includes receiving the request from the principal in response to mining a. plurality of other buzzes and providing a notice to the principal via a dashboard service listing the buzz as a potential buzz of interest to the principal.

7. The method of claim 1, wherein acquiring further includes obtaining the goals, the principal criteria, and the policies via a template presented to the principal and accepted or modified by the principal.

8. The method of claim 1, wherein acquiring further includes obtaining a moderator for the buzz as identified by the principal or other moderators of the buzz.

9. The method of claim 1, wherein acquiring further includes obtaining one or more initial proposals for resolution and discussion within the buzz by the principal.

10. The method of claim 1, wherein initiating further includes starting the buzz when a start time defined in the policies is reached or starting the buzz at state times when the buzz is a recurring buzz.

11. The method of claim 1, wherein initiating further includes sending invitations to the participants to engage one another in the buzz.

12. A method implemented in a non-transitory machine-readable storage medium and processed by one or more processors configured to perform the method, comprising:
 receiving a request from a principal to initiate an online collaboration decision making process referred to as a buzz;
 determining when an existing buzz is present that matches the request and when so proposing the existing buzz to the principal to satisfy the request, wherein determining further includes performing a scoring technique using a threshold value to identify a substantial match on the existing buzz;
 joining the principal to the existing buzz when the principal agrees, the existing buzz and the buzz become one and the same;
 initiating the buzz as a new buzz when the principal does not agree to joining the existing buzz, the new buzz and the buzz become one and the same; and
 using a trend indicator within the summary details to inform the principal when decisions for the buzz are becoming less likely and permitting the principal to interject additional information into the buzz to alter the trend and steer the buzz back on a track that the principal desires and providing at least some of the summary details for a particular different principal to the principal and permitting the principal to influence that particular principal in a particular direction by interrogating and using at least in part recorded activities and a history for the particular different principal and the buzz as a whole in permitting the principal to influence that particular principal in the particular direction, and wherein the principal participates in the buzz under multiple different identities.

13. The method of claim 12 further comprising, presenting on a dashboard of the principal summary details for the buzz as the buzz progresses.

14. The method of claim 13, wherein presenting further includes presenting identities with the summary details to inform the principal of identities for other principals to which the summary details relate.

15. The method of claim 12, wherein initiating further includes selectively copying policies, goals, proposals, and attributes of the existing buzz when initiating the new buzz for the principal.

16. A non-transitory multi-processor implemented system, comprising:
   a first processor configured to start a buzz controller, the buzz controller configured to initiate one or more online collaborative decision processes, referred to as buzzes;
   a second processor configured to start a buzz modulator, the buzz modulator configured to send instructions to participants in the buzz and allow the participants to interact with the buzz and the buzz modulator configured to support a direction of a particular buzz made by a particular participant using instructions received from the particular participant of that particular buzz; and
   a third processor configured to start a buzz event processor, the buzz event processor configured to raise and detect events occurring within the buzzes and send notices and take actions based on the events;
   the buzz controller joins the participants to t le buzzes and ensures policies for each buzz are satisfied, the buzz controller joins each of the participants when that participant is assigned to a role defined in a role list by a principal, the buzz modulator provides information to the buzz controller, the buzzes, and the participants via the instructions, the buzz event processor traps some of the events from the buzz controller, the buzz modulator, and the buzzes for purposes of generating other events that are then communicated to the buzz controller, the buzz modulator, and the buzzes and decisions for each buzz are automatically made based on policies, proposals, and goals for that buzz by interrogating and using at least in part recorded activities and histories for the participants and the buzzes as a whole in automatically making the decisions for each buzz, wherein at least one of the participants participates in the buzz using multiple different identites.

17. The system of claim 16, wherein at least one buzz is a closed-decision making process where a leader is assigned and when a decision is reached, that buzz concludes.

18. The system of claim 16, wherein at least one buzz is an open-decision making process where more than one leader exists and each leader self-appoints his/her leadership role within that buzz and when one decision is reached other decisions still exists that spawn off as sub buzzes.

19. The system of claim 18, wherein the buzz controller splits at least one buzz into two or more separate buzzes that are linked to one another.

* * * * *

UNITED STATES PATENT AND TRADEMARK OFFICE
CERTIFICATE OF CORRECTION

| | | |
|---|---|---|
| PATENT NO. | : 9,224,126 B2 | Page 1 of 1 |
| APPLICATION NO. | : 12/782230 | |
| DATED | : December 29, 2015 | |
| INVENTOR(S) | : Vaidya et al. | |

It is certified that error appears in the above-identified patent and that said Letters Patent is hereby corrected as shown below:

On the Title page, in item (75), in "Inventors", in column 1, line 1, after "Banglore", insert --, Karnataka--, therefor

In The Claims

In column 12, line 13, in Claim 6, delete "a." and insert --a--, therefor

In column 13, line 28, in Claim 16, delete "t le" and insert --the--, therefor

In column 14, line 16, in Claim 16, delete "identites." and insert --identities.--, therefor Signed and Sealed this
Twenty-third Day of August, 2016

Michelle K. Lee
*Director of the United States Patent and Trademark Office*